US 6,669,304 B2

(12) United States Patent
Binning

(10) Patent No.: US 6,669,304 B2
(45) Date of Patent: Dec. 30, 2003

(54) SIDE DUMP TRAILER DEVICE

(76) Inventor: Burleigh Binning, 35 BD Blvd. P.O. Box 767, Pinedale, WY (US) 82941

( * ) Notice: Subject to any disclaimer, the term of this patent is extended or adjusted under 35 U.S.C. 154(b) by 384 days.

(21) Appl. No.: 09/779,577

(22) Filed: Feb. 9, 2001

(65) Prior Publication Data

US 2003/0047984 A1 Mar. 13, 2003

Related U.S. Application Data

(60) Provisional application No. 60/247,022, filed on Nov. 13, 2000.

(51) Int. Cl.[7] .................................................. B60P 1/28
(52) U.S. Cl. ................... 298/17.7; 298/17.6; 298/17 B; 298/18
(58) Field of Search .......................... 298/7, 13, 17 R, 298/17.5, 17.6, 17.7, 17 B, 18

(56) References Cited

U.S. PATENT DOCUMENTS

| 74,131 | A | * | 2/1868 | Priest ........................ 298/17 R |
|---|---|---|---|---|
| 914,925 | A | * | 3/1909 | Chance ....................... 105/272 |
| 1,909,969 | A | * | 5/1933 | Kuchar ....................... 298/17.6 |
| 2,848,275 | A | | 8/1958 | Armington ................. 298/17.6 |
| 3,320,000 | A | * | 5/1967 | Goodman ....................... 298/7 |
| 4,242,031 | A | * | 12/1980 | McMullen .................. 414/470 |
| 4,430,038 | A | | 2/1984 | Rempel et al. ............. 414/346 |
| 4,494,798 | A | | 1/1985 | Bailey ........................ 298/17.6 |
| 5,431,481 | A | | 7/1995 | Boyer ....................... 298/35 R |
| 5,449,224 | A | * | 9/1995 | Johnson ......................... 298/2 |
| 5,480,214 | A | | 1/1996 | Rogers ....................... 298/17.6 |
| 5,597,211 | A | | 1/1997 | Golden ...................... 298/17.6 |
| 5,845,971 | A | | 12/1998 | Rogers ......................... 298/18 |
| 5,906,417 | A | | 5/1999 | Golden ...................... 298/17.6 |
| 2003/0047984 | A1 | * | 3/2003 | Binning ........................ 298/18 |

* cited by examiner

Primary Examiner—Joseph D. Pape
Assistant Examiner—Paul Chenevert
(74) Attorney, Agent, or Firm—Tipton L. Randall

(57) ABSTRACT

A side dump trailer that empties to either side includes a generally rectangular chassis with front and rear axles, each having a pair of wheels, with the front axle secured to the chassis via a swivel connection to allow steering of the trailer with a tongue. The chassis has an elevated rectangular open top box trapezoidal in cross section with a closed bottom supported on the chassis and a larger open top. The box is fastened to the chassis by four pairs of cylindrical bushings, one of each pair fastened at each corner of the box and the other of each pair fastened to the chassis. The bushing pairs each receive a removable connector pin. Removing the connector pins from bushings on one side of the box allow the box to pivot and dump to the opposite side of the trailer.

17 Claims, 9 Drawing Sheets

SIDE DUMP TRAILER DEVICE

CROSS REFERENCE TO RELATED APPLICATION

This application claims the benefit under 35 U.S.C. §119 (e) of co-pending provisional application Ser. No. 60/247,022, filed Nov. 13, 2000 Application Ser. No. 60/247,022 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

FIELD OF THE INVENTION

The present invention relates to a trailer device and, more particularly, to a manually operated side dump trailer device.

BACKGROUND OF THE INVENTION

Side dump trailers are well known implements used in construction and agriculture. Some examples of innovative devices, including side dump trailers, for transporting and dumping materials are shown in the following patents.

In U.S. Pat. No. 2,848,275, Armington describes a frameless side dump trailer, having a cart type body with a draw bar for attachment to a tractor and a rear extension member mounted to the rear wheels. The body is supported on each end by pairs of interlocking brackets with each bracket rotatably connected to the lower supporting parts. The trailer body is emptied by attaching a hoist or crane to the middle of one side of the body using a chain, and elevating the connected side with the hoist or crane. The rotational pins are permanently connected to the brackets and supports.

Rempel et al., in U.S. Pat. No. 4,430,038, disclose a power dump wagon with a conventional four-wheeled chassis with a triangular support frame (FIG. 4), holding a wagon box (FIG. 5). The box is pivotally fastened at one side to the triangular support frame at about ⅔ the height of the box. A piston and cylinder assembly is fastened between one edge of the chassis and near the center line of the box, at about ⅔ the box height. Extending the cylinder assembly pivots and empties the box. A conveyor in one side of the box assists in emptying the contents of the box. The box pivots only to one side of the chassis.

Bailey, in U.S. Pat. No. 4,494,798, discloses a dual side-dumping tractor and trailer assembly having a container bed supported on front and rear bunk assemblies. Hydraulic cylinders are fastened between each bunk assembly and one upper end of the container bed. The bunk assemblies are rotatably mounted to the trailer chassis (FIG. 7). Releasable hinge-mounted assemblies are positioned at each end of the bunks and are operated by cables. Releasing the hinges on one side of the trailer and extending the hydraulic cylinders dumps the contents of the container bed 10 (FIG. 5).

U.S. Pat. No. 5,431,481 by Boyer shows a side dumping trailer with a hopper box on a frame of a tractor-trailer. The box has side gates operated by hydraulic or pneumatic cylinders, that control the opening of side doors of the hopper box, thus allowing dumping of the box contents to either side of the hopper box.

In U.S. Pat. No. 5,480,214, Rogers describes a side dump trailer pulled by a truck having a fifth wheel. The trailer body is supported at the corners on rocker pin assemblies (FIG. 6). One of a pair of hydraulic cylinders is mounted at the top edge of each end of the trailer body and to the frame. Releasing the two rocker pin assemblies on one side of the trailer and extending the hydraulic cylinders, tilts the body to the opposite side and empties the trailer contents.

Golden, in U.S. Pat. No. 5,597,211, discloses a similar bidirectional side dump trailer with pivot connectors and supporting the trailer box. An elevating assembly beneath the box has two power cylinders with a lever between them to elevate and pivot the box to empty the contents.

In U.S. Pat. No. 5,845,971, Rogers describes another side dump trailer pulled by a truck having a fifth wheel. The trailer body is supported along both sides by supports that mate with other supports (FIG. 4). The first supports are rotatably attached in a permanent configuration, while other supports are releasably attached. A number of power cylinders are fastened between the frame and the bottom of the body which has the releasable supports. Extending the power cylinders with the supports detached rotates and tilts the body to empty the contents to one side of the trailer only.

Golden, in U.S. Pat. No. 5,906,417, discloses yet another bidirectional side dump trailer with hydraulically operated pivot connectors and with either a power cylinder below the box (FIG. 2) or with power cylinders at each end of the box (FIG. 11).

Thus, there exists an unmet need for a bidirectional side dump trailer that can fit into narrow confines, and which can be manually dumped by an individual. Further, there is a need for a side dump trailer which employs an elevated trailer box which an individual can selectively empty to one side or to the other as desired.

SUMMARY OF THE INVENTION

The present invention is a side dump trailer that empties to either side. The trailer includes a generally rectangular chassis with front and rear axles, each having a pair of wheels. The front end of the trailer chassis has a tongue with hitch for attachment to a suitable powered vehicle, with the front axle secured to the chassis via a swivel connection to allow steering of the trailer with the tongue. The chassis has an elevated support portion upon which a generally rectangular open top box is mounted. The box is trapezoidal in cross section, with a closed bottom supported on the elevated support portion of the chassis and an open top larger than the closed bottom thereof. The box is fastened to the support portion by four pairs of cylindrical bushings, one of each pair fastened at each corner of the box and the other of each pair fastened to the support portion. The bushing pairs each receive a removable connector pin inserted through both bushings. The apertures in the bushings and the connector pin are aligned with the chassis longitudinal center line. The trailer box is emptied by removing the connector pins from the two pairs of bushings on one side of the trailer, and elevating the side of the box adjacent thereto, pivoting the box on the two sets of bushings and pins on the opposite side, such that the contents of the box empties to the pivoting side of the box. A stop means secured to the chassis limits the rotational movement of the box to either side and prevents the box contents from falling on the wheels when emptying the box. The box is returned to the upright position by rotating the box in the opposite direction. Significantly, the side dump trailer requires only a single individual to empty the box selectively to one side or to the other, as desired.

DESCRIPTION OF THE PREFERRED EMBODIMENTS

Figure 1:
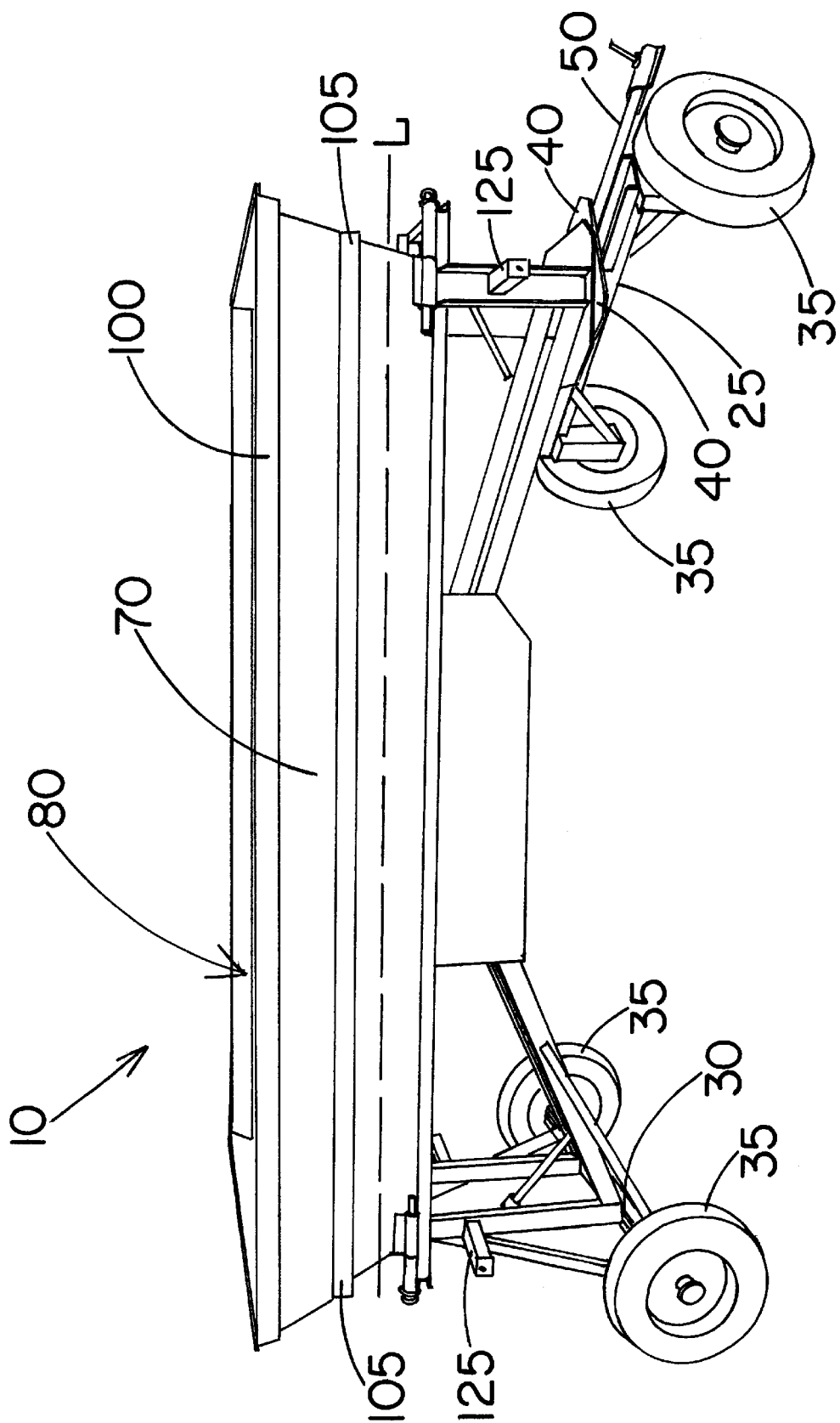
FIG. 1 is a plan side perspective view of the side dump trailer of the present invention.
Figure 2:
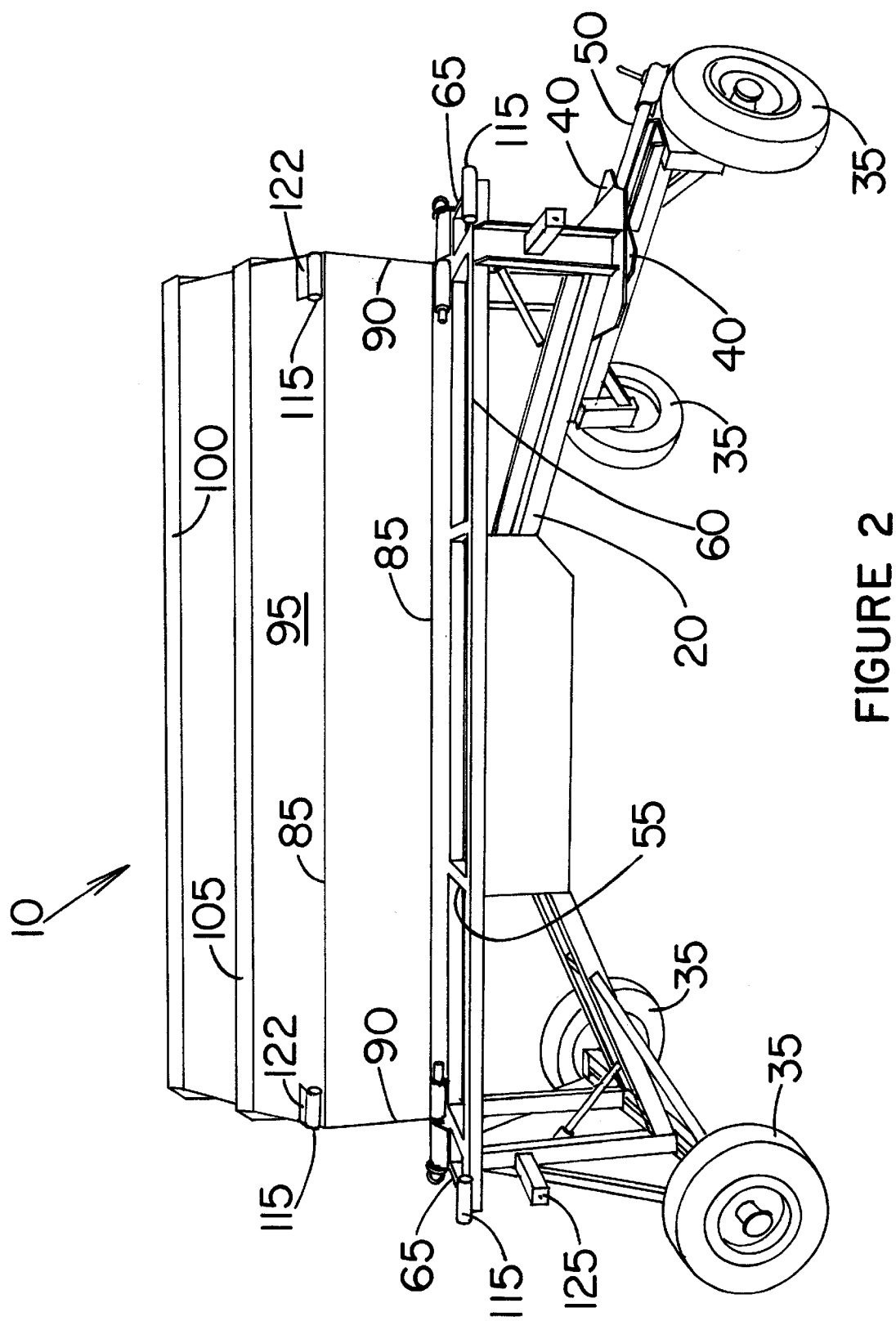
FIG. 2 is a plan side perspective view of the side dump trailer of the present invention with the trailer box emptying to one side.
Figure 3:
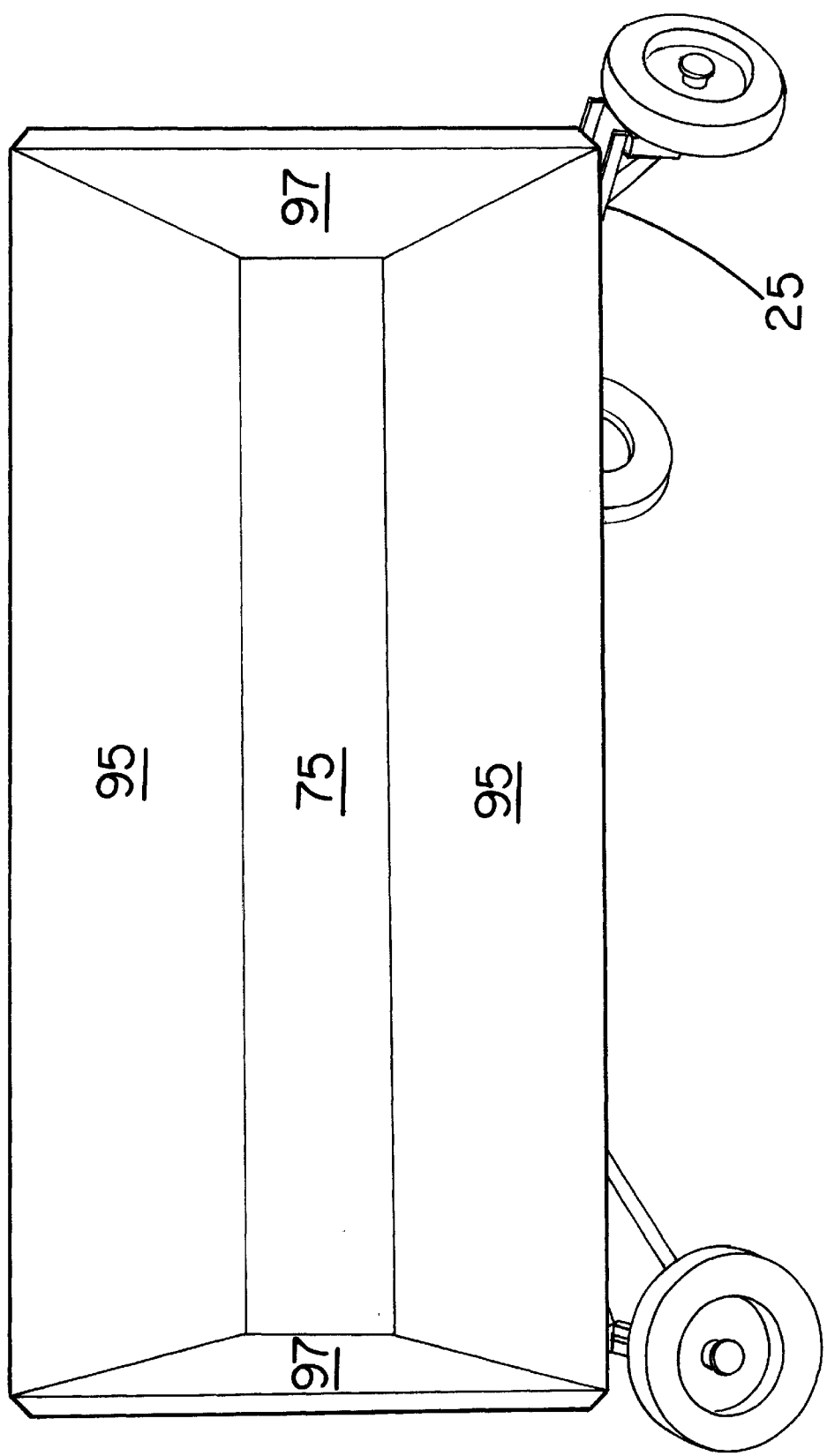
FIG. 3 is a plan side perspective view of the side dump trailer of the present invention with the trailer box emptying to the other side.
Figure 4:
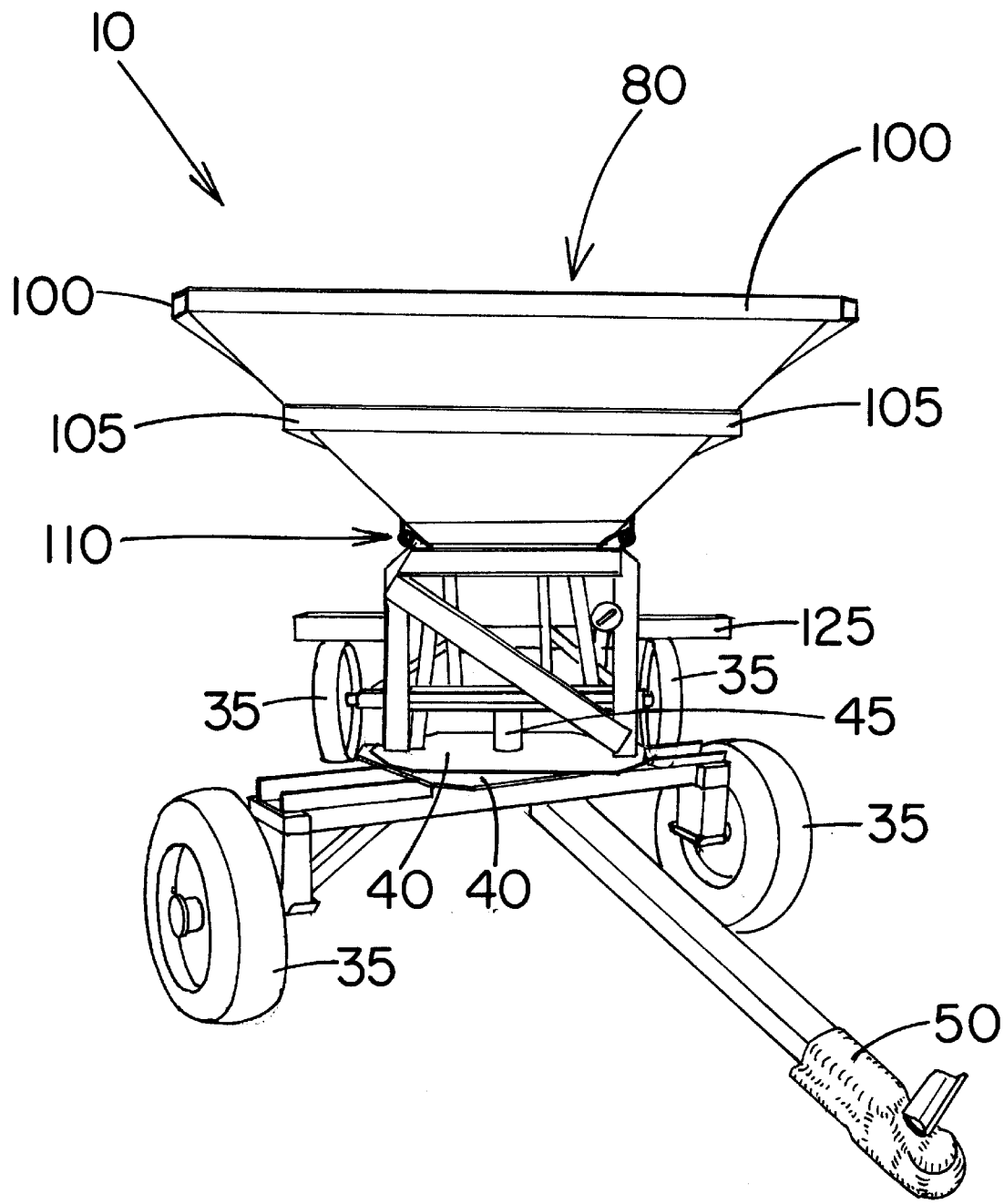
FIG. 4 is a plan front perspective view of the side dump trailer of the present invention.
Figure 5:
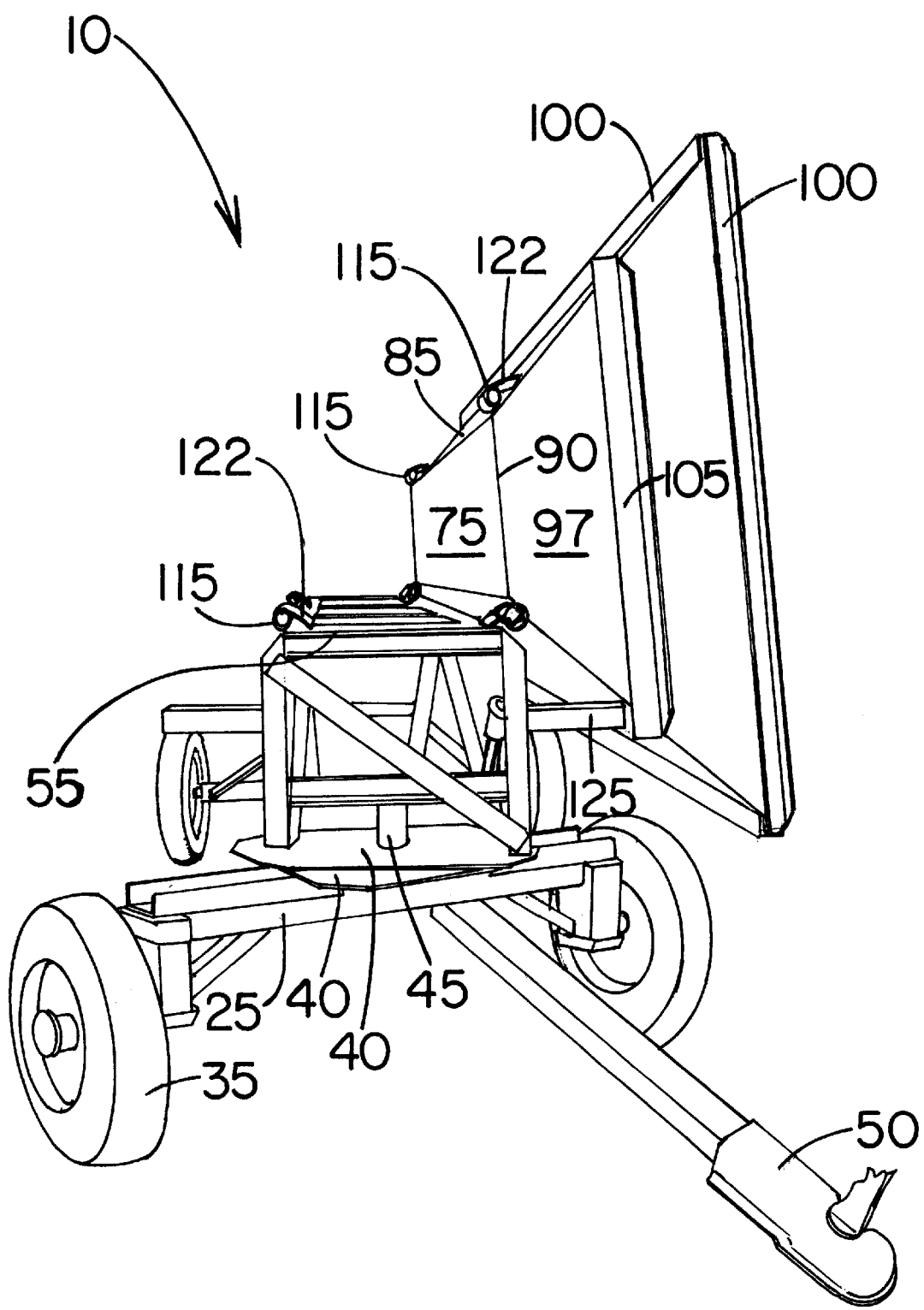
FIG. 5 is a plan front perspective view of the side dump trailer of the present invention with the trailer box emptying to one side.

Nomenclature
  L Longitudinal Center Line of Chassis
  10 Side Dump Trailer Assembly
  20 Rectangular Chassis
  25 Front Axle
  30 Rear Axle
  35 Wheels
  40 Pivot Plates
  45 Pivot Shaft
  50 Trailer Tongue
  55 Rectangular Support Surface
  60 Side Edges of Support Surface
  65 End Edges of Support Surface
  70 Box Member
  75 Closed Bottom of Box Member
  80 Open Top of Box Member
  85 Side Edges of Closed Bottom
  90 End Edges of Closed Bottom
  95 Angled Sides of Box Member
  97 Vertical Ends of Box Member
  100 Box Reinforcement Member
  105 Box Stop Contact Member
  110 Releasable Fastening Means
  115 Cylindrical Bushing Members
  120 Connector Pin Member
  122 Reinforcement Plate Member
  125 Chassis Linear Stop Member
  130 Insertable Pin Member
  135 Apertures in Pivot Plates
  140 Skid Plate Member Construction The present invention is a side dump trailer assembly that selectively empties to either side. Referring now to FIGS. 1–6, the trailer assembly 10 includes a rectangular chassis 20 having a longitudinal center line L. The rectangular chassis 20 includes a front axle 25 and a rear axle 30, with each axle having a wheel 35 at each end thereof. The front axle 25 is pivotally connected to the chassis 20 by means of two pivot plates 40 and a pivot shaft 45. One pivot plate 40 is attached to the front axle 25 and the other pivot plate 40 is fastened to the chassis 20. The pivot shaft 45 is secured to the axle pivot plate 40 and extends through an aperture in the chassis pivot plate 40, allowing pivoting of the front axle 25 relative to the rest of the chassis 20. The front axle 25 also has a tongue 50 attached for moving and steering the trailer assembly 10 via attachment to a powered vehicle. The rectangular chassis 20 includes a rectangular support surface 55 located a selected distance above the axle wheels 35. The rectangular support surface 55 has two side edges 60 parallel with the chassis center line L and two end edges 65 perpendicular to the chassis center line L. The chassis 20 is fabricated from suitable linear steel stock for strength and durability.

A rectangular open top box member 70 is supported and fastened to the rectangular support surface 55 atop the chassis 20. The box member 70 has a trapezoidal cross section perpendicular to the chassis center line L, and a rectangular cross section parallel with the chassis center line L. The box member 70 includes a flat closed bottom 75 supported on the chassis rectangular support surface 70, and an open top 80 larger than the closed bottom 75 and opposite the chassis rectangular support surface 55. The box member closed bottom 75 has two side edges 85 that are parallel with the chassis center line L and two end edges 90 that are perpendicular to the chassis center line L. The side edges 85 and end edges 90 are adjacent the side edges 60 and end edges 65 of the rectangular support surface 55, with the closed bottom 75 slightly smaller in both length and width than the rectangular support surface 55 of the chassis member 20.

The box member 70 has planar sides 95 and planar ends 97 that extend from the closed bottom end 75 to the open top end 80 to contain the contents of the box member 70. Preferably the box member 70 is fabricated from steel sheet stock that is welded together at the edges. To minimize the thickness and weight of the steel sheet stock required, a box reinforcement member 100 is fastened to the planar sides 95 and ends 97 around the outside of the open top 80 thereof. The reinforcement member 100 is preferably angle iron or similar linear metal stock fastened together in a continuous exterior rim that encircles the open top 80 of the box member 70. Additionally, a box stop contact member 105 is fastened to the exterior surface of the planar sides 95 at about half the height of the box member 70. Preferably, the box stop contact member 105 is fabricated from angle iron or similar linear metal stock fastened together in a continuous exterior rib that encircles the box member 70 at about half the height thereof. The continuous rib serves as the box stop contact member 105 and provides additional reinforcement of the sides 95 and ends 97 of the box member 70.

Figure 8:
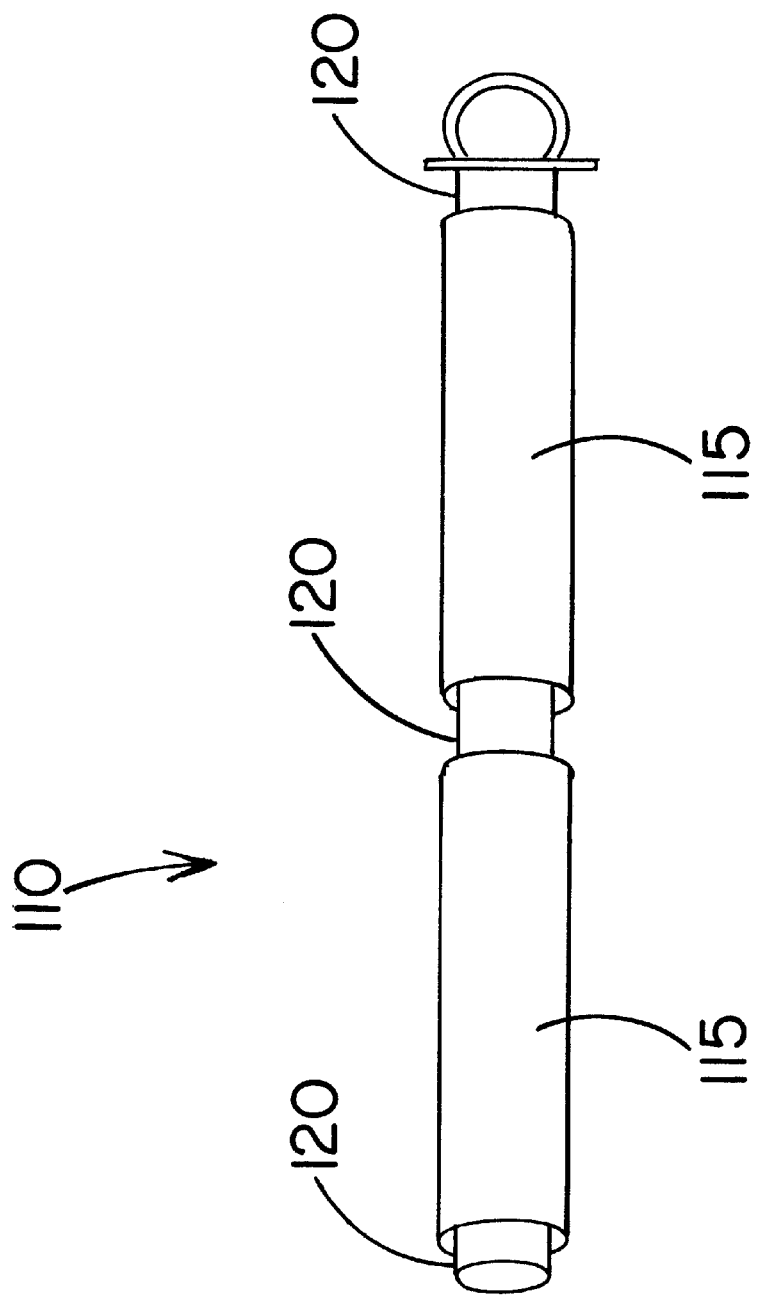
FIG. 8 is a plan perspective view of the bushing member pair and connector pin member of the side dump trailer of the present invention.

A rotatable, releasable fastening means 110 between each of the box member closed bottom side edges 85 and the chassis rectangular support surface side edges 60 adjacent thereto, is provided for securing the box member 70 to the chassis support surface 55. Preferably the rotatable, releasable fastening means 110 on each side edge 85 of the box member 70 and support surface side edges 60 includes two pairs of cylindrical bushing members 115 adjacent the edges, one bushing member 115 of each pair is fastened to the box member closed bottom side edge 85 and the other bushing member 115 of each pair is fastened to the chassis support surface side edge 60. Each pair of cylindrical bushing members 115 is aligned with the chassis longitudinal center line L and a removable connector pin member 120 is inserted through each cylindrical bushing pair 115 to fasten the box member 70 to the support surface 55. Preferably the bushing members 115 are hollow, open ended cylindrical members at least about six inches in length and about an inch in outside diameter, with the connector pin member 120 fitting snugly through the interior of the aligned pair of bushing members 115. A pair of bushing members 115 with a connector pin member 120 inserted there through is shown in FIG. 8. The bushing members 115 are preferably also fabricated from steel and are attached to the box member 70 and support surface 55 by welding. Because the bushing members 115 are cylindrical, a steel reinforcement plate member 122 is added between each bushing member 115 and the point of attachment to the box member 70 or the support surface 55, again by welding.

As mentioned above, the closed bottom end 75 of the box member 70 is slightly smaller in both width and length compared to the rectangular support surface 55 of the chassis member 20. This produces a notch between the box member 70 and the support surface 55 along each bottom side edge 85 of the box member 70. On each side of the box member 70 one bushing member 115 of each pair is positioned in the notch and fastened to the box member exterior side 95 with one end of the bushing member 115 flush with the box member end edge 90. The other bushing member 115 of each pair is positioned and fastened atop the side edge 60 of the support surface 55 beyond each end 97 of the box member 70, with both bushing members 115 of the pair aligned to accept a connector pin member 120 inserted there through. Each bushing member 115 includes a reinforcement plate member 122 for additional strength. The placement of one bushing member 115 of each pair beyond each end 97 of the box member 70 provides for unobstructed insertion and removal of the connector pin member 120 when securing or releasing the pairs of bushings 115 on one side of the box member 70.

A box stop means 125 is secured to the rectangular chassis 20 between the rectangular support surface 55 and the wheels 35 on each side of the chassis 20. The box stop means 125 is oriented perpendicular to the chassis center line L and parallel with the ground, the stop means serving to limit rotational movement of the box member 70 about the rotatable fastening means 110 positioned between the box member closed bottom side edges 85 and the chassis rectangular support surface side edges 60. The box stop means 125 is preferably two pairs of spaced apart linear members secured to the chassis member 20 adjacent each chassis support surface side edge 60.

To empty the contents of the open top box member 70, the operator releases the fastening means 110 between one box member side edge 85 and the adjacent chassis support surface side edge 60. This allows the box member 70 to be emptied by elevation of the box member 70 released side with rotation of the box member 70 about the fastened side edge 85. The stop means 125 limits the rotation of the box member 70 relative to the chassis member 20 by contacting the stop contact member 105 on the box member 70, thereby preventing the contents of the box member 70 from falling on the wheels 35 and axles 25, 30 of the trailer assembly 10. The position of the rotatable fastening means 110 at the side edges of both the box bottom 75 and the support surface 55 provides the proper rotational center such that a single individual can readily empty the contents of the box 70 by elevating the released side thereof by hand.

Figure 6:
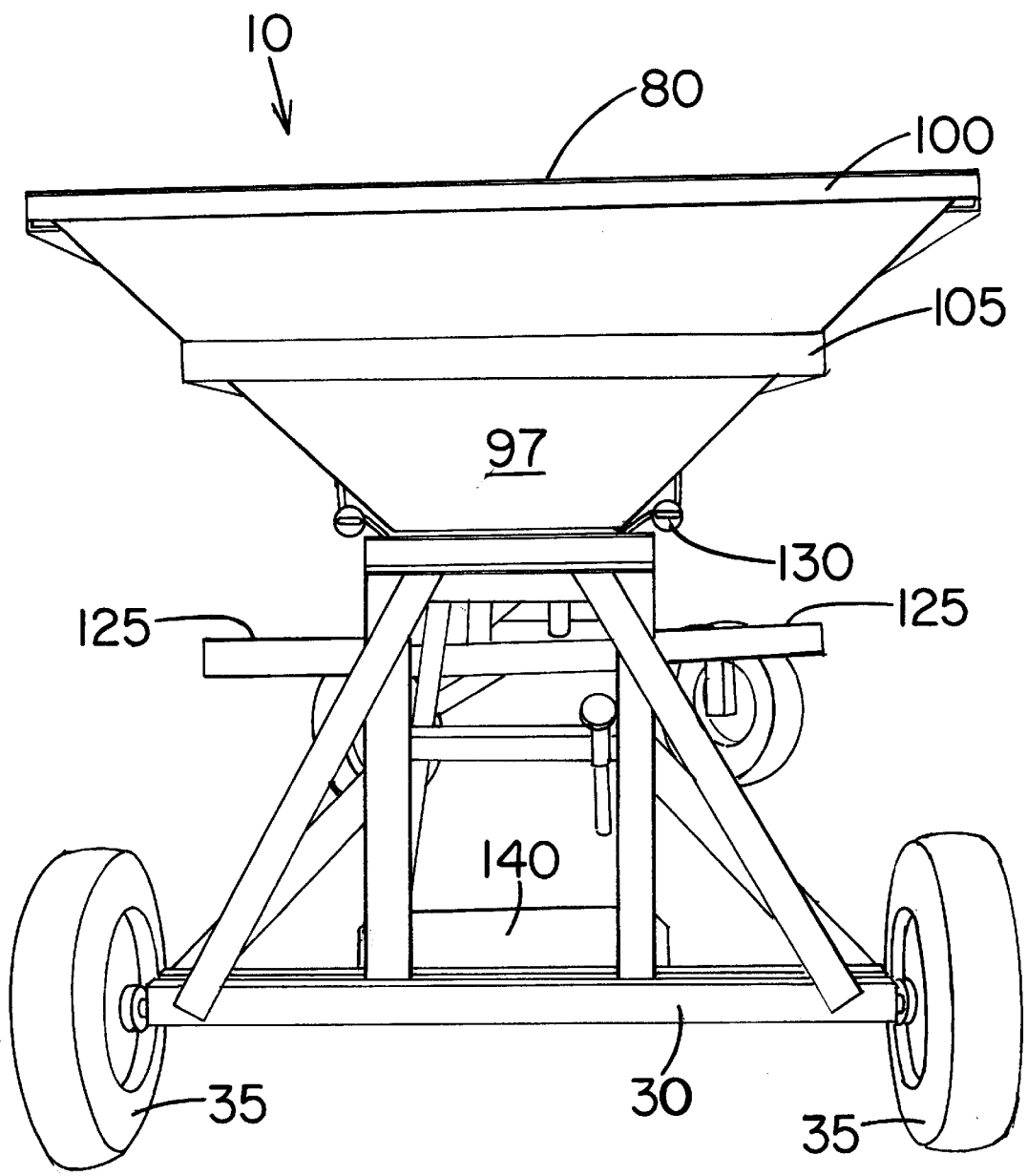
FIG. 6 is a plan rear perspective view of the side dump trailer of the present invention.
Figure 7:
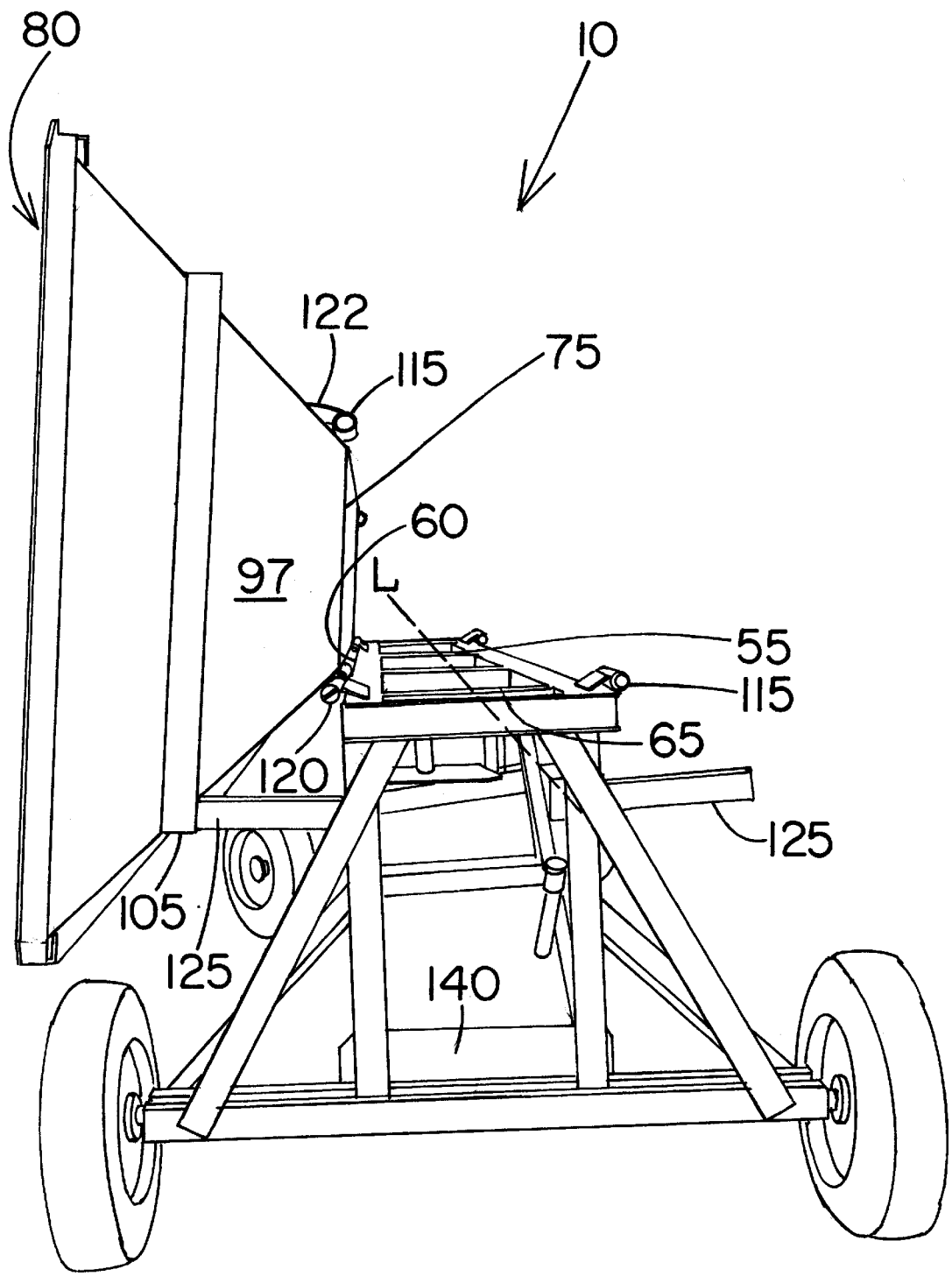
FIG. 7 is a plan rear perspective view of the side dump trailer of the present invention with the trailer box emptying to one side.
Figure 9:
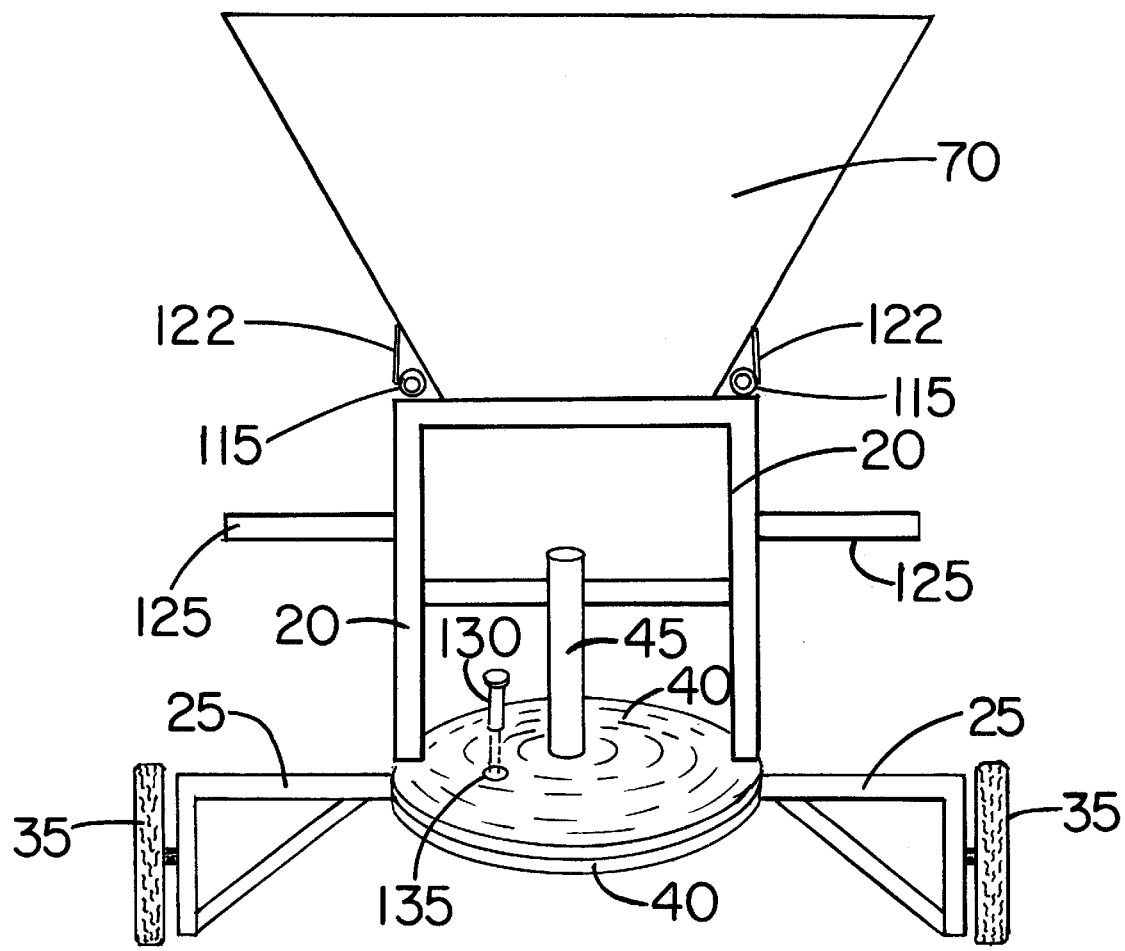
FIG. 9 is a plan front perspective view of the pivoting front axle of the side dump trailer of the present invention.

In a further embodiment of the invention, a pin member 130 is inserted through alignable apertures 135 in the pivot plate 40 of the front axle 25 and the pivot plate 40 of the chassis member 20 to prevent pivoting of the front axle 25 as shown in FIG. 9. The pin member 130 positioned in the aligned apertures 135 serves to hold the front axle 25 in a fixed orientation relative to the chassis member 20 and allows the operator to easily back the trailer assembly 10 with a powered vehicle attached to the tongue 50 thereof. Additionally, a skid plate member 140 is secured beneath the rear axle member 30 with the skid plate member 140 inclined toward the front axle member 25 as seen in FIGS. 6 and 7. The skid plate member serves to deflect the rear axle member 30 over obstacles such as rocks or stumps.

While the invention has been particularly shown and described with reference to a preferred embodiment thereof, it will be understood by those skilled in the art that various changes in form and details may be made therein without departing from the spirit and scope of the invention.

I claim:

1. A side dump trailer device emptying selectively to either one side or the other side, comprising:
    (a) a rectangular chassis having a longitudinal center line, the chassis including front and rear axles, each axle having a wheel at each end thereof, the front axle pivotally connected to the chassis, the front axle having a tongue attached thereto, the rectangular chassis including a rectangular support surface of selected width and length, a selected distance above the axle wheels;
    (b) a rectangular open top box member supported and fastened to the rectangular support surface atop the chassis, the box member having a trapezoidal cross section with a flat closed bottom of selected width and length supported on the chassis rectangular support surface, and an open top larger than the closed bottom and opposite the chassis rectangular support surface, the rectangular support surface and the box member closed bottom each having two side edges parallel with the chassis center line and two end edges perpendicular to the chassis center line, the chassis rectangular support surface two end edges extending beyond the box member closed bottom end edges;
    (c) rotatable, releasable fastening means between each of the box member closed bottom side edges and the chassis rectangular support surface side edges adjacent thereto;
    (d) stop means secured to the rectangular chassis between the rectangular support surface and the wheels, the stop means perpendicular to the chassis center line and limiting rotational movement of the box member about the rotatable fastening means between the box member closed bottom side edges and the chassis rectangular support surface side edges;
    (e) whereby releasing the fastening means between one box member side edge and the adjacent chassis support surface edge allows the box member to empty by elevation of the box member released side with rotation of the box member about the fastened side edge, the stop means limiting rotation of the box member relative to the chassis.

2. The side dump trailer device according to claim 1, further including a reinforcement member around the box member open top.

3. The side dump trailer device according to claim 1, further including a stop contact member secured to an exterior side surface of the box member midway between the box member closed bottom and the box member open top.

4. The side dump trailer device according to claim 1 wherein, the box member closed bottom width is less than the chassis rectangular support surface width.

5. The side dump trailer device according to claim 1 wherein, the stop means secured perpendicularly to the chassis includes two pair of spaced apart linear members, one pair adjacent each chassis support surface side edge.

6. The side dump trailer device according to claim 1, further including a pin member insertable through alignable apertures in a front axle pivot plate member and a chassis pivot plate member to prevent pivoting of the front axle.

7. The side dump trailer device according to claim 1, further including a skid plate member secured beneath the rear axle and inclined toward the front axle for deflecting the rear axle over obstacles.

8. The side dump trailer device according to claim 1 wherein, the rotatable, releasable fastening means between each of the box member side edges and each of the chassis support surface side edges include two pairs of cylindrical bushing members between the edges, one bushing member of each pair fastened to the box member closed bottom side edge and the other bushing member of each pair fastened to the chassis support surface edge, each pair of cylindrical bushing members aligned with the chassis longitudinal center line and a removable connector pin member inserted through each cylindrical bushing pair.

9. The side dump trailer device according to claim 8 wherein, one bushing member of each pair is fastened to the box member closed bottom side edge adjacent the box member bottom end edge and the other bushing member of each pair is fastened to the chassis support surface edge beyond the box member bottom end edge.

10. A side dump trailer device emptying selectively to either one side or the other side, comprising:
(a) a rectangular chassis having a longitudinal centerline, the chassis including front and rear axles, each axle having a wheel at each end thereof, the front axle pivotally connected to the chassis, the front axle having a tongue attached thereto, the rectangular chassis including a rectangular support surface of selected width and length, a selected distance above the axle wheels;
(b) a rectangular open top box member supported and fastened to the rectangular support surface atop the chassis, the box member having a trapezoidal cross section with a flat closed bottom of a width less than the chassis rectangular support surface width and supported thereon, and an open top larger than the closed bottom and opposite the chassis rectangular support surface, the rectangular support surface and the box member closed bottom end each having two side edges parallel with the chassis center line and two end edges perpendicular to the chassis center line, the chassis rectangular support surface two end edges extending beyond the box member closed bottom end edges;
(c) rotatable, releasable fastening means between each of the box member closed bottom side edges and the chassis rectangular support surface side edges adjacent thereto;
(d) stop means secured to the rectangular chassis between the rectangular support surface and the wheels, the stop means including two pair of spaced apart linear members perpendicular to the chassis center line, one pair adjacent each chassis support surface side edge, the stop means limiting rotational movement of the box member about the rotatable fastening means between the box member closed bottom side edges and the chassis rectangular support surface side edges;
(e) a stop contact member secured to an exterior side surface of the box member midway between the box member closed bottom and the box member open top;
(f) whereby releasing the fastening means between one box member side edge and the adjacent chassis support surface edge allows the box member to empty by elevation of the box member released side with rotation of the box member about the fastened side edge, the stop means limiting rotation of the box member relative to the chassis.

11. The side dump trailer device according to claim 10, further including a reinforcement member around the box member open top.

12. The side dump trailer device according to claim 10, further including a pin member insertable through alignable apertures in a front axle pivot plate member and a chassis pivot plate member to prevent pivoting of the front axle.

13. The side dump trailer device according to claim 10, further including a skid plate member secured beneath the rear axle and inclined toward the front axle for deflecting the rear axle over obstacles.

14. The side dump trailer device according to claim 10 wherein, the rotatable, releasable fastening means between each of the box member side edges and each of the chassis support surface side edges include two pairs of cylindrical bushing members between the edges, one bushing member of each pair fastened to the box member closed bottom side edge and the other bushing member of each pair fastened to the chassis support surface edge, each pair of cylindrical bushing members aligned with the chassis longitudinal center line and a removable connector pin member inserted through each cylindrical bushing pair.

15. The side dump trailer device according to claim 14 wherein, one bushing member of each pair is fastened to the box member closed bottom side edge adjacent the box member bottom end edge and the other bushing member of each pair is fastened to the chassis support surface edge beyond the box member bottom end edge.

16. A side dump trailer device emptying selectively to either one side or the other side, comprising:
(a) a rectangular chassis having a longitudinal centerline, the chassis including front and rear axles, each axle having a wheel at each end thereof, the front axle pivotally connected to the chassis, the front axle having a tongue attached thereto, the rectangular chassis including a rectangular support surface of selected width and length, a selected distance above the axle wheels;
(b) a rectangular open top box member supported and fastened to the rectangular support surface atop the chassis, the box member having a trapezoidal cross section with a flat closed bottom of a width less than the chassis rectangular support surface width and supported thereon, and an open top larger than the closed bottom and opposite the chassis rectangular support surface, the rectangular support surface and the box member closed bottom end each having two side edges parallel with the chassis center line and two end edges perpendicular to the chassis center line;
(c) rotatable, releasable fastening means between each of the box member closed bottom side edges and the chassis rectangular support surface side edges adjacent thereto including two pairs of cylindrical bushing members between each adjacent edges, one bushing member of each pair fastened to the box member closed bottom side edge and the other bushing member of each pair fastened to the chassis support surface edge, each pair of cylindrical bushing members aligned with the chassis longitudinal center line and a removable connector pin member inserted through each cylindrical bushing pair;

(d) stop means secured to the rectangular chassis between the rectangular support surface and the wheels, the stop means including two pair of spaced apart linear members perpendicular to the chassis center line, one pair adjacent each chassis support surface side edge, the stop means limiting rotational movement of the box member about the rotatable fastening means between the box member closed bottom side edges and the chassis rectangular support surface side edges;

(e) a stop contact member secured to an exterior side surface of the box member midway between the box member closed bottom and the box member open top; and (f) a pin member insertable through alignable apertures in a front axle Divot plate member and a chassis pivot plate member to prevent pivoting of the front axle;

(g) whereby releasing the fastening means between one box member side edge and the adjacent chassis support surface edge allows the box member to empty by elevation of the box member released side with rotation of the box member about the fastened side edge, the stop means limiting rotation of the box member relative to the chassis.

17. The side dump trailer device according to claim 16, further including a skid plate member secured beneath the rear axle and inclined toward the front axle for deflecting the rear axle over obstacles.

* * * * *